United States Patent

[11] 3,563,475

[72] Inventors Robert B. Emery;
Richard F. Bailey, Duncan, Okla.
[21] Appl. No. 841,910
[22] Filed July 15, 1969
[45] Patented Feb. 16, 1971
[73] Assignee Halliburton Company
Duncan, Okla.
a corporation of Delaware

[54] TRAILER FOR TRANSPORTING AND DISPENSING PULVERULENT MATERIAL
9 Claims, 4 Drawing Figs.

[52] U.S. Cl............................................. 239/654;
239/146; 280/5
[51] Int. Cl..................................................... A01c 15/04
[50] Field of Search.......................................... 239/650,
651, 654, 208, 146, 178, 286; 280/5C, 5D, 5E,
423; 222/193, 176; 221/185; 298/24; 214/83. 28;
302/59; 296/15; 105/358; 169/24; 52/731, 220,
221

[56] References Cited
UNITED STATES PATENTS
562,175  6/1896  Edwards....................... 52/731
2,019,230 10/1935 Lyon............................. 52/731X
2,536,263  1/1951 Cellwork....................... 280/5(C)
2,809,074 10/1957 McDonald..................... 239/209
2,865,521 12/1958 Fisher et al................... 214/83.28
2,901,133  8/1959 Weller.......................... 214/83.28
3,132,600  5/1964 Allard.......................... 298/24X
3,311,269  3/1967 Mendez........................ 222/176
3,465,654  9/1969 Fox.............................. 52/220X Primary Examiner—M. Henson Wood, Jr.
Assistant Examiner—Edwin D. Grant
Attorney—Dunlap, Laney, Hessin & Dougherty ABSTRACT: The present invention relates to an improved trailer for transporting and dispensing pulverulent material having at least one bin for storing said material and a source of compressed air for unloading said bin and conveying said material mounted thereon. The trailer includes a frame having a load support rail extending along each side thereof, and having a wheel assembly and means for connecting the frame to a motor vehicle attached to opposite ends thereof. A material conveying line is integrally incorporated in one or both of the load support rails thereby greatly increasing the strength of the frame and obviating the need for supporting the material conveying lines above or below the frame.

PATENTED FEB 16 1971
3,563,475
SHEET 1 OF 2
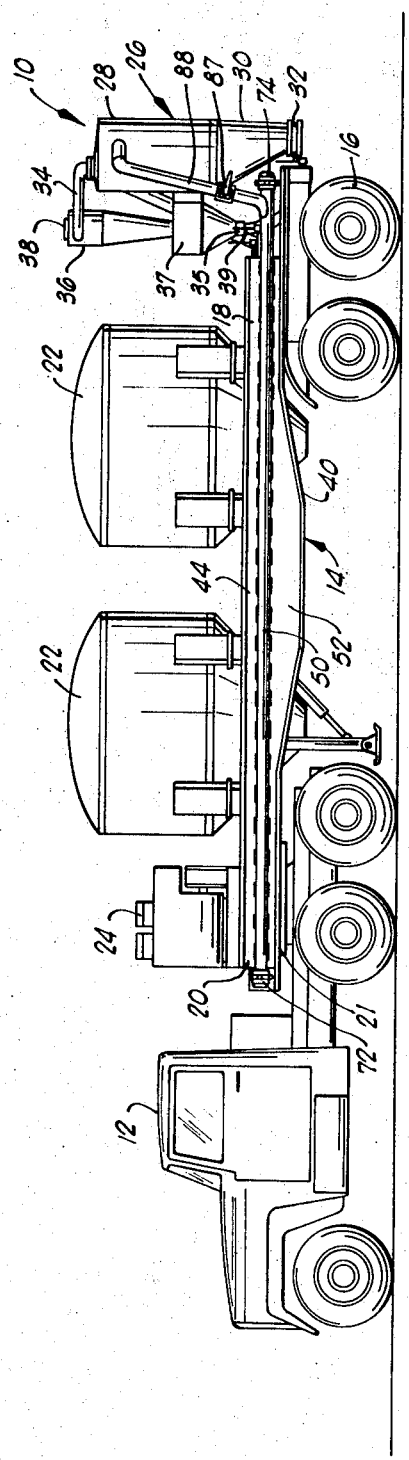
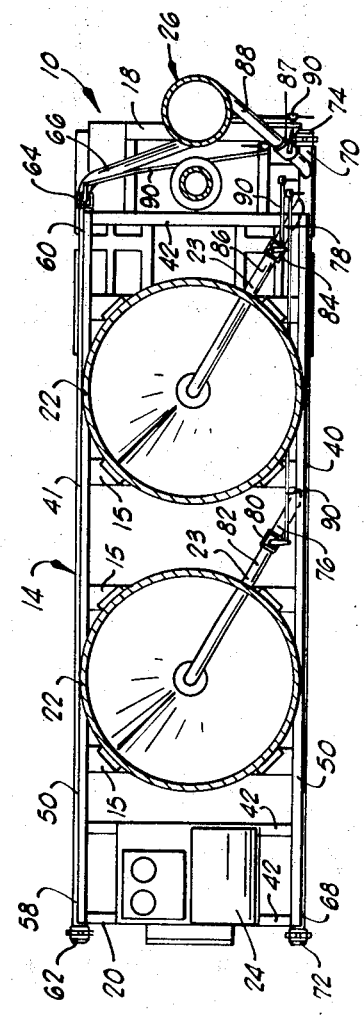
INVENTORS.
ROBERT B. EMERY &
RICHARD F. BAILEY
BY
Dunlap, Laney, Hessin & Dougherty
ATTORNEYS

TRAILER FOR TRANSPORTING AND DISPENSING PULVERULENT MATERIAL

BACKGROUND OF THE INVENTION

1. Field of the Invention

The present invention relates generally to an improved trailer for transporting and dispensing pulverulent material, and more particularly, but not by way of limitation, to an improved trailer for transporting and dispensing pulverulent material which includes a frame having a load support rail extending along each side thereof, and having a material conveying line integrally incorporated in one or both of said load support rails.

2. Description of the Prior Art

Many various types of trailers for transporting and dispensing pulverulent material have been developed. Commonly, such trailers include one or more bins for storing the pulverulent material while it is being transported, and a source of compressed air, such as a conventional gasoline engine driven compressor, for pneumatically unloading the bins and conveying the pulverulent material therefrom. For example, in the drilling and treatment of oil, gas and water wells, ingredients for drilling fluids, cements, and other treating formulations are often transported to the well site in pulverulent form, dispensed into mixing apparatus where they are mixed with various fluids such as water, brine or oil and utilized in the drilling or treatment of the well. In most instances, several different materials must be continuously mixed in particular quantities or proportions during the particular treatment or well operation performed. Thus, it is often desirable to pneumatically convey several different pulverulent materials from one or more transport trailers into a single mixing apparatus or accumulating receptacle.

Heretofore, trailers of the type mentioned above for transporting and dispensing pulverulent materials, such as the materials used in well cement slurries, and the like, have been equipped with a plurality of valves and material conveying lines having hose connections attached thereto so that several of such trailers may be connected together by hoses to continuously pneumatically convey various materials into a single receptacle. Such material conveying lines and relating equipment have been rigidly supported above or below the trailer frame, or both, adding weight to the trailer frame and requiring the use of support brackets, flexible connectors, etc. Since a particular size of trailer is limited to a certain maximum weight by local and national road and highway regulatory agencies, the weight of pulverulent material that can be transported by the trailer is reduced in direct proportion to the weight of the material conveying lines and related equipment installed on the trailer.

By the present invention an improved trailer of the type described above is provided wherein material conveying lines are integrally incorporated in the trailer frame thereby increasing the strength of the frame and resulting in a frame of comparable weight to conventional frames. Consequently, separate material conveying lines are not required, and a greater weight of pulverulent material may be transported by the trailer as compared to prior art trailers of the same size. Furthermore, the trailer of the present invention is less costly to manufacture than comparable prior art trailers in that supporting brackets, flexible connectors, hook-up labor, etc., are not required for supporting material conveying lines above or below the trailer frame.

SUMMARY OF THE INVENTION

The present invention relates to a trailer for transporting and dispensing pulverulent material having at least one bin for storing said material and a supply of compressed air connected to said bin for pneumatically unloading and conveying said material mounted thereon, comprising a frame having a forward end and a rearward end, said frame including a load support rail extending along each side thereof, a wheel assembly attached to the rearward end of said frame, means for connecting said frame to a motor vehicle attached to the forward end of said frame, and a material conveying line integrally incorporated in one of said frame load support rails connected to said bin.

It is, therefore, a general object of the present invention to provide an improved trailer for transporting and dispensing pulverulent material.

A further object of the present invention is the provision of a trailer for transporting and dispensing pulverulent material wherein one or more material conveying lines are integrally incorporated in the trailer frame thereby obviating the need for mounting said material conveying lines above or below the frame.

Yet a further object of the present invention is the provision of a trailer for transporting and dispensing pulverulent material having material conveying lines thereon wherein a greater weight of pulverulent material can be transported as compared to prior art trailers.

Still a further object of the present invention is to provide a trailer for transporting and dispensing pulverulent material having material conveying lines thereon for interconnecting a plurality of such trailers which is less expensive to manufacture than comparable prior art trailers.

Other objects and advantages of the present invention will be evident from the following detailed description when read in conjunction with the accompanying drawings.

BRIEF DESCRIPTION OF THE DRAWINGS

FIG. 1 is a side elevational view of a trailer of the present invention.

FIG. 2 is a top view of the trailer of FIG. 1 partially in section.

DESCRIPTION OF THE PREFERRED EMBODIMENT

Figure 3:
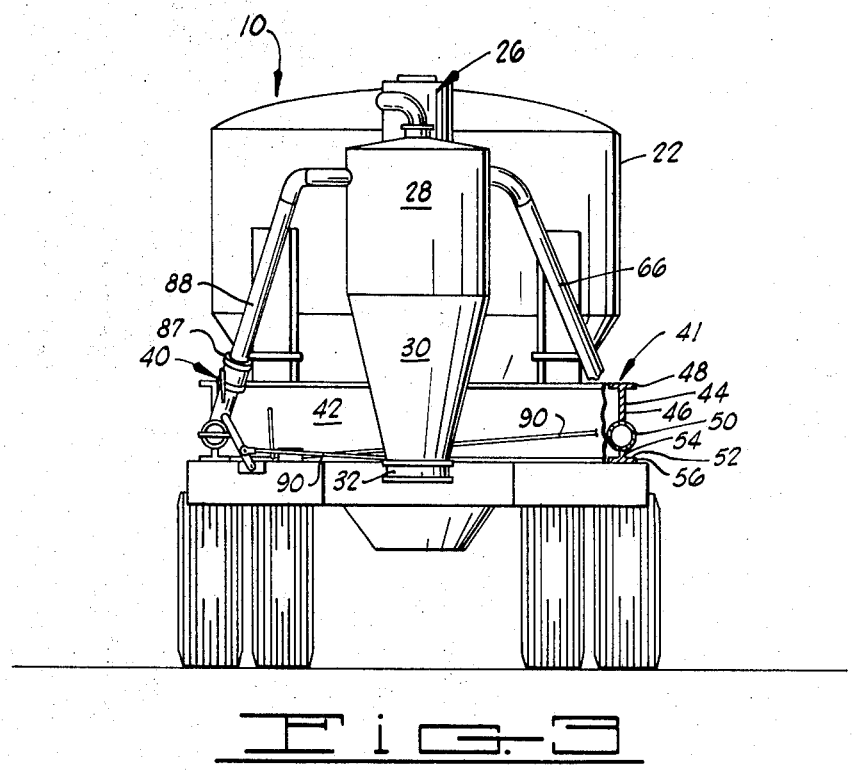
FIG. 3 is an elevational view of the rearward end of the trailer of FIG. 1 with one of the load support rails shown in section.

Referring to FIGS. 1 through 3, the improved trailer of the present invention is generally designated by the numeral 10. The trailer 10 basically comprises a frame 14 having a conventional wheel assembly or bogey 16 attached to the rearward end 18 thereof, and having a conventional fifth wheel assembly 21 for connecting the trailer 10 to a motor vehicle 12 (FIG. 1) attached to the forward end 20 thereof. One or more bins 22 for storing and dispensing pulverulent material are mounted on the frame 14 by means of crossmembers 15 welded to the frame 14. The bins 22 are of a type which may be uniformly pneumatically unloaded through discharge pipes 23 passing through the shells thereof located at or near the bottom thereof. A bin of the type disclosed in U.S. Pat. No. 3,367,723 dated Feb. 6, 1968 is preferred for use in the present invention.

A conventional gasoline engine driven air compressor 24 is mounted on the forward end 20 of the frame 14 for supplying compressed air to the bins 22 for unloading and conveying pulverulent material therefrom. The compressed air from air compressor 24 is connected to the bins 22 by a conventional piping system (not shown) supported on the frame 14.

A conventional separating and pulverulent material dispensing apparatus 26 is mounted on the frame 14 at the rearward end 18 thereof. The apparatus 26 includes a conventional primary cyclone separator 28 wherein air is separated from the pulverulent material. The separated material passes into a hopper 30 attached to the separator 28 having a discharge valve 32 attached to the lower end thereof. The air separated in the primary separator 28 passes through a conduit 34 into a secondary cyclone separator 36 wherein pulverulent material carried over with the air from separator 28 is separated therefrom. The air then passes out of secondary separator 36 through an opening 38 disposed in the top thereof, and pulverulent material accumulates in a hopper 37 connected to the lower portion of separator 36. A valve 35 and a hose 39 are connected to the hopper 37 for periodically removing pulverulent material therefrom.

Referring still to FIGS. 1 through 3, the frame 14 comprises a pair of identical load support rails 40 and 41 extending the length of the frame 14 interconnected by crossmembers 42. As shown best in FIG. 3, the load support rails 40 and 41 are each comprised of an upper section 44 of T-shape in cross section having a vertical leg 46 and a horizontal leg 48. The upper section 44 may be a section of a conventional steel I-beam which has been cut horizontally along the length thereof. The bottom of the vertical leg 46 is cut in a plane parallel with the horizontal leg 48. A length of steel pipe 50, positioned with the axis thereof in a vertical plane coinciding with the vertical leg 46 of upper section 44, is welded to vertical leg 46 along the entire length thereof. A lower section 52 of T-shape in cross section having a vertical leg 54 and a horizontal leg 56 is positioned below the pipe 50 with the leg 54 in vertical alignment with the leg 46 of upper section 44. The upper end of vertical leg 54 of the lower section 52 is welded to pipe 50 along the entire length thereof. As can be best seen in FIG. 1, the height of vertical leg 54 of lower section 52 varies throughout the length of the load support rails 40 and 41 with the greatest height being at the center portions thereof, and the least height at the ends thereof. This configuration is required since the greatest load is exerted on the load support rails 40 and 41 at the center portions thereof. As will be understood by those skilled in the art, the particular height of the leg 54 of the lower section 52 required at any particular point along the length of the load support rails 40 and 41 may be determined by conventional engineering techniques. Additionally, the particular configuration, size and thickness of the load support rails 40 and 41 and crossmembers 42 will vary with the particular load to be carried by the frame 14, and the distribution of the load over the length of frame 14. The crossmembers 42, which may be conventional I-beams, are positioned vertically and welded to the load support rails 40.

The pipes 50 of load support rails 40 and 41 extend a short distance beyond the ends of the upper sections 44 and lower sections 52 thereof. The pipe 50 which is integrally incorporated in the load support rail 41 includes a forward end 58 and a rearward end 60. A conventional blind union 62 is welded or otherwise attached to the forward end 58 of the pipe 50 of rail 41. Union 62 is preferably of the hammer lug type which may be used to close the end of the pipe 50, or in the alternative, to threadedly secure a conventional hose thereto. The rearward end 60 of the pipe 50 of rail 41 is connected to valve 64, preferably of the butterfly type which is in turn connected to a conduit 66. The conduit 66 is connected to primary separator 28 of the separating and dispensing apparatus 26.

The pipe 50 which is integrally incorporated in the load support rail 40 includes a forward end 68 and a rearward end 70. A pair of unions 72 and 74, of the same type as union 62 described above, are welded or otherwise attached to the ends 68 and 70 of the pipe 50 of rail 40.

A pair of conduits 76 and 78 are welded to pipe 50 of rail 40 positioned in alignment with the discharge pipes 23 of bins 22. A valve 80 is attached to conduit 76 which is in turn attached to the material discharge pipe 23 of one of bins 22 by a conduit 82. Conduit 78 is attached to a valve 84 which is in turn attached to the material discharge pipe 23 of the other of bins 22 by a conduit 86. A conduit 88 is welded to the pipe 50 of rail 40 between the end 70 thereof and conduit 78. A valve 87 is disposed in conduit 88 and is attached to primary separator 28 of the apparatus 26 in a like manner as conduit 66.

As shown in the drawings, the valves 64, 80, 84 and 87, and discharge valve 32 may be equipped with remote hand actuators 90 so that they may be conveniently operated from a central point at the rearward end of the trailer 10.

As will be understood by those skilled in the art, the trailer 10 may include one or more of the bins 22, and the separating and dispensing apparatus 26 may or may no be mounted thereon. Additionally, it may be desirable to include only one material conveying line integrally incorporated in one of the load support rails 40 or 41. Furthermore, it is to be understood that the present invention is not limited to a trailer for supporting the specific apparatus described above, but may be employed in any trailer utilized in transporting and dispensing pulverulent material.

OPERATION

Referring to FIG. 2, each of the bins 22 are loaded with pulverulent material. The bins 22 may each contain different pulverulent materials, the same pulverulent materials, or mixtures of different pulverulent materials. After the trailer 10 has been transported to the site where the pulverulent materials are to be used, it is positioned with the discharge valve 32 of separating and dispensing apparatus 26 positioned over a hopper or other receptacle for receiving the materials (not shown). In unloading and conveying the pulverulent material from a single trailer, either or both of valves 80 and 84 are opened as well as valve 87, and valve 64 is closed. Air compressor 24 is then started and air is supplied to the bins 22. The air is caused to flow upwardly from the bottom of the bins with sufficient pressure to fluidize the pulverulent material contained therein. The fluidized material is induced out of the bottom of the bins 22 through the outlet pipes 23. As the material is unloaded from the bins it passes from the pipes 23 into pipe 50 of load support rail 40, through conduit 88 and into the separating and dispensing apparatus 26. Upon entering separating and dispensing apparatus 26 the air is separated from the pulverulent material, and the pulverulent material passes through discharge valve 32 thereof. As will be understood, if desired, material can be unloaded from either of the bins 22 separately by opening valves 80 and 84 one at a time, or if each of the bins 22 contains different materials, the materials may be mixed in a desired proportion by adjusting the valves 80 and 84 accordingly. The pipe 50 of load support rail 41 may be connected by a hose to another source of pneumatically conveyed pulverulent material and the valve 64 opened, thereby causing the material to simultaneously pass into the apparatus 26 with the material from bins 22.

Figure 4:
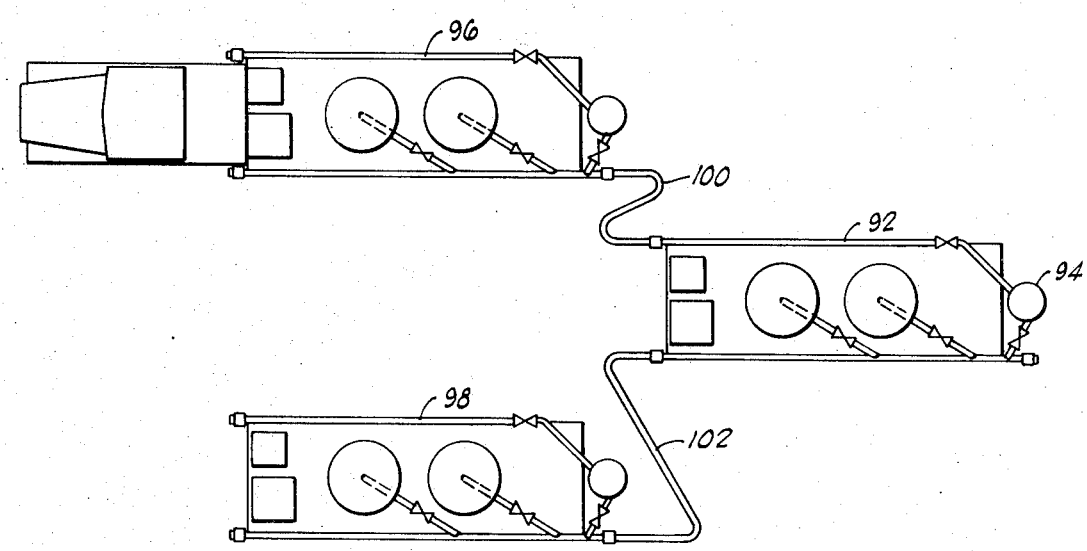
FIG. 4 is a view in schematic form of three trailers of the present invention interconnected by hoses.

If large quantities of pulverulent material are required, or if several different types of pulverulent materials are required for a particular mixture, several trailers of the present invention may be connected together by hoses. For example, let it be assumed that three different types of pulverulent materials are to be dispensed into a hopper. Referring to FIG. 4, the trailer 92 containing a first type of pulverulent material may be positioned with the separating and dispensing apparatus 94 mounted thereon positioned over a receptacle for receiving the materials. A second trailer 96 containing the second type of material, and a third trailer 98 containing the third type of material, may be positioned near the trailer 92. The material conveying line of trailer 96 which is connected to the bins mounted thereon may be connected by a hose 100 to one of the material conveying lines of trailer 92. The material conveying line of trailer 98 which is connected to the bins mounted thereon may be connected to the other of the material conveying lines of trailer 92 by a second hose 102. By opening and closing the appropriate valves on each of the trailers, material may be conveyed into the separating and dispensing apparatus 94 of trailer 92 continuously and simultaneously from the bins mounted on all three of the trailers 92, 96 and 98.

Thus, an improved trailer for transporting and dispensing pulverulent material is provided wherein required material conveying lines are integrally incorporated in the trailer frame. By the present invention a greater weight of pulverulent material may be carried on the trailer due to the increased strength of the frame and the reduction of the trailer weight as compared to prior art trailers. Furthermore, the present invention provides a trailer which is less expensive to manufacture than prior art trailers due to the fact that supporting brackets, flexible connectors and labor required to mount material conveying lines above or below the frame are not required.

The present invention therefore is well adapted to carry out the objects and attain the ends and advantages mentioned as well as those which are inherent therein. While presently preferred embodiments of the invention have been given for the purpose of disclosure, numerous changes in the details of construction and arrangement of parts can be made which will readily suggest themselves to those skilled in the art and which are encompassed in the spirit of the invention disclosed herein.

We claim:

1. In a trailer for transporting and dispensing pulverulent material having at least one bin for storing said material and a supply of compressed air connected to said bin for pneumatically unloading and conveying said material mounted thereon, the improvement comprising:
    a frame having a forward end and a rearward end, said frame including a load support rail extending along each side thereof;
    a wheel assembly attached to the rearward end of said frame;
    means attached to the forward end of the said frame for connecting said frame to a motor vehicle; and
    a material conveying line integrally incorporated in one of said frame load support rails and connected to said bin.

2. The trailer of claim 1 wherein said material conveying line comprises:
    an elongated first conduit extending the length of said frame, having a forward end and a rearward end, and integrally incorporated in said load support rail;
    a second conduit attached to said bin and attached to said first conduit at a point between the forward and rearward ends thereof; and
    union means for closing the ends of said first conduit, or alternatively threadedly connecting hoses thereto, said union means being respectively attached to the forward and rearward ends of said first conduit.

3. The trailer of claim 2 which is further characterized to include valve means disposed in said second conduit for controlling the flow of material conveyed from said bin.

4. The trailer of claim 3 which is further characterized to include:
    means attached to said frame for separating air from said pulverulent material and for discharging said pulverulent material; and
    a third conduit connecting said first conduit and said means for separating and discharging said pulverulent material said third conduit being attached to said first conduit at a point between the forward and rearward ends thereof.

5. The trailer of claim 4 which is further characterized to include valve means disposed in said third conduit for controlling the flow of material conveyed to said means for separating and discharging said material.

6. The trailer of claim 5 which is further characterized to include a second material conveying line integrally incorporated in the other of said load support rails and connected to said means for separating and discharging pulverulent material.

7. The trailer of claim 6 wherein said second material conveying line comprises:
    an elongated fourth conduit extending the length of said frame, having a forward end and a rearward end, and integrally incorporated in said other load support;
    a fifth conduit attached to said means for separating and discharging pulverulent material and attached to the rearward end of said fourth conduit; and
    union means for closing the forward end of said fourth conduit, or alternatively threadedly connecting a hose thereto, said union means being attached to the forward end of said fourth conduit.

8. The trailer of claim 7 which is further characterized to include valve means disposed in said fifth conduit for controlling the flow of material conveyed to said means for separating and discharging said material.

9. A frame for a trailer utilized in transporting and dispensing pulverulent material having a bin for storing said material and a source of compressed air for pneumatically unloading said bin and conveying said material mounted thereon, comprising;
    a pair of side rails interconnected by a plurality of crossbeams, each of said side rails comprising:
    an upper section extending the length of the frame;
    a lower section extending the length of the frame, and positioned in vertical alignment with said upper section;
    a conduit for conveying said pulverulent material, said conduit being positioned between said upper and lower sections and integrally attached thereto.